(12) United States Patent
Shafik et al.

(10) Patent No.: US 11,915,294 B2
(45) Date of Patent: Feb. 27, 2024

(54) PREDICTIVE ORCHESTRATION OF DATA SETS WITHIN MARKETPLACE

(71) Applicant: EMC IP Holding Company LLC, Hopkinton, MA (US)

(72) Inventors: Farida Shafik, Cairo (EG); Nicole Reineke, Northborough, MA (US); Joel Christner, El Dorado Hills, CA (US); Omar Abdulaal, Giza (EG); Shary Beshara, Cairo (EG)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 186 days.

(21) Appl. No.: 17/384,444

(22) Filed: Jul. 23, 2021

(65) Prior Publication Data

US 2023/0036220 A1    Feb. 2, 2023

(51) Int. Cl.
*G06Q 30/00*    (2023.01)
*G06F 16/9535*    (2019.01)
*G06F 16/9537*    (2019.01)
*G06Q 30/0601*    (2023.01)

(52) U.S. Cl.
CPC ..... *G06Q 30/0631* (2013.01); *G06F 16/9535* (2019.01); *G06F 16/9537* (2019.01)

(58) Field of Classification Search
CPC .......... G06Q 30/06–08; G06F 16/9535; G06F 16/9537
See application file for complete search history.

(56) References Cited

U.S. PATENT DOCUMENTS

| | | | |
|---|---|---|---|
| 9,250,819 B2 * | 2/2016 | Rao | G06F 12/0223 |
| 2019/0004725 A1 * | 1/2019 | Shah | G06F 3/0631 |
| 2020/0043073 A1 * | 2/2020 | Greenberger | G06Q 10/0836 |
| 2021/0124603 A1 * | 4/2021 | Rafey | G06N 20/00 |

* cited by examiner

*Primary Examiner* — Ethan D Civan
(74) *Attorney, Agent, or Firm* — Workman Nydegger (57) ABSTRACT

One example method includes data orchestration. Data sets are available to users in an online marketplace. Based on requests for data sets, other data sets may be recommended. The recommended data sets are moved or copied to recommended locations. This ensures that the data sets are available to the user more quickly if subsequently requested.

18 Claims, 5 Drawing Sheets

PREDICTIVE ORCHESTRATION OF DATA SETS WITHIN MARKETPLACE

FIELD OF THE INVENTION

Embodiments of the present invention generally relate to orchestrating data sets in a computing environment. More particularly, at least some embodiments of the invention relate to systems, hardware, software, computer-readable media, and methods for predictively orchestrating data sets in a computing network.

BACKGROUND

Data and data sets are becoming increasingly valuable. Businesses often leverage data to find insights that help them operate more effectively and efficiently. Not surprisingly, the amount of data has increased along with the demand for the data. This has led to the creation of data marketplaces, which are essentially online marketplaces where users can browse or search for data sets according to their needs. Once a suitable data set is identified, the data set is accessed. For example, a user may access the data set directly or download the data set.

As one might expect, the data sets may be very large. This leads to a phenomenon called "data gravity" where the sheer size and volume of data makes movement prohibitive from a cost and/or a performance perspective. As a result, users that access the data marketplace have different experiences that is often dependent on their proximity to the data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to orchestrating access and movement of data sets. More particularly, at least some embodiments of the invention relate to systems, hardware, software, computer-readable media, and methods for predictively orchestrating access and movement of data sets in a computing system.

In general, embodiments of the invention orchestrate the movement of data sets, partially or fully, to different locations based on recommendation systems. This improves both the user experience because the data is closer to the user and enhances the performance of the data marketplace because the data is in an optimal location prior to receiving a request for the data from a user. Thus, embodiments of the invention improve the user experience by intelligently orchestrating the movement of data sets in a predictive manner and also recommending data sets of interest or that may be of interest to users.

Embodiments of the invention consider the issues caused by data gravity and, using AI/ML (Artificial Intelligence/Machine Learning), provide a data marketplace where data sets or portions thereof, are recommended and proactively moved to different locations in order to decrease data loading time and mitigate the effects of data gravity.

A recommendation engine may use content-based mechanisms to make recommendations based on the metadata of the data sets and may use collaborative mechanisms that use similar users to predict the data sets or portions thereof that may be requested. Similar users may be determined based on access patterns and user metadata.

In addition, typical data copy or processing locations for specific users, groups, or applications are tracked. This helps identify locations to which data sets may be moved. This information may be augmented with topography and infrastructure information to perform practical placement analysis and cost assessment.

Data sets are used for many purposes including ML training. Moving these data sets to a location near a user (e.g., a data scientist) is often inconvenient. As a result, applications and users tend to coalesce around the data set, which is contrary to distributing the data set to locations near the users. Further, coalescing around the data set may lead to various issued including read/write consistency issues, access collisions when multiple users are using the same copy of the data set, and the like. Embodiments of the invention ameliorate many of these issues.

More specifically, data sets experience data gravity due to the cost of moving a data set, the time required to move the data set, or the like. Embodiments of the invention help overcome these concerns by predictively moving data sets or portions thereof. In other words, embodiments of the invention may move a part of a data set—the part that, based on an ML inference, is likely to be requested by a user. Predictive placement or movement of data sets or portions thereof can improve satisfaction rates among users, reduce time-to-access, and improve performance.

Data scientists often spend a significant amount of time searching for meaningful data sets. For various reasons including different is nomenclature, some data sets that may be relevant are often overlooked. Embodiments of the invention overcome this issue by providing the ability to recommend data sets regardless of nomenclature. For example, a data set that is relevant to a first user may be recommended to a second user that is similar to the first user or that is using data sets similar to the data sets used by the first user.

Figure 1A:
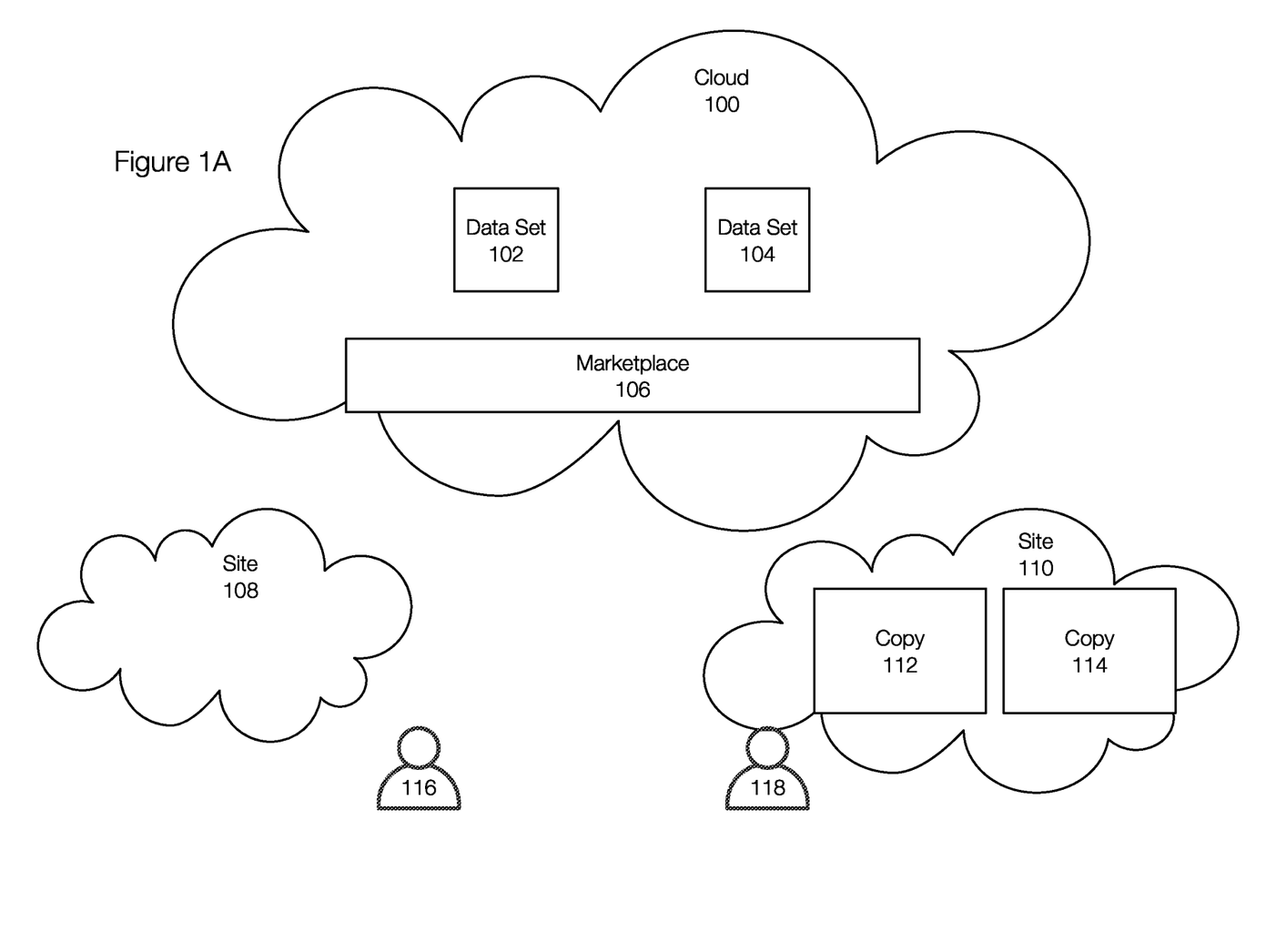
FIG. 1A discloses aspects of data orchestration in a computing environment.

FIG. 1A illustrates an example of a data marketplace configured to make data sets available to multiple users. In FIG. 1A, a marketplace 106 (e.g., an online store) may be implemented in a cloud 100. The marketplace 106 may have inventory or data sets, represented by data sets 102 and 104, that are made available to users represented by users 116 and 118.

In this example, the user 118 has previously downloaded copies 112 and 114 of the data sets 102 and 104 to the site 110. Because the site 110 is close to the user 118, the copies 112 and 114 can be accessed more quickly, performance of data operations using the copies 112 and 114, and the like are improved. Instead of having the data sets 102 and 104 moved or copied to the site 110, the user 118 may also access the data sets 102 and 104 from the storage associated with the marketplace 106 in the cloud 100. The site 110 may also be associated with the marketplace 106 or may be storage associated with the user 118.

Figure 1B:
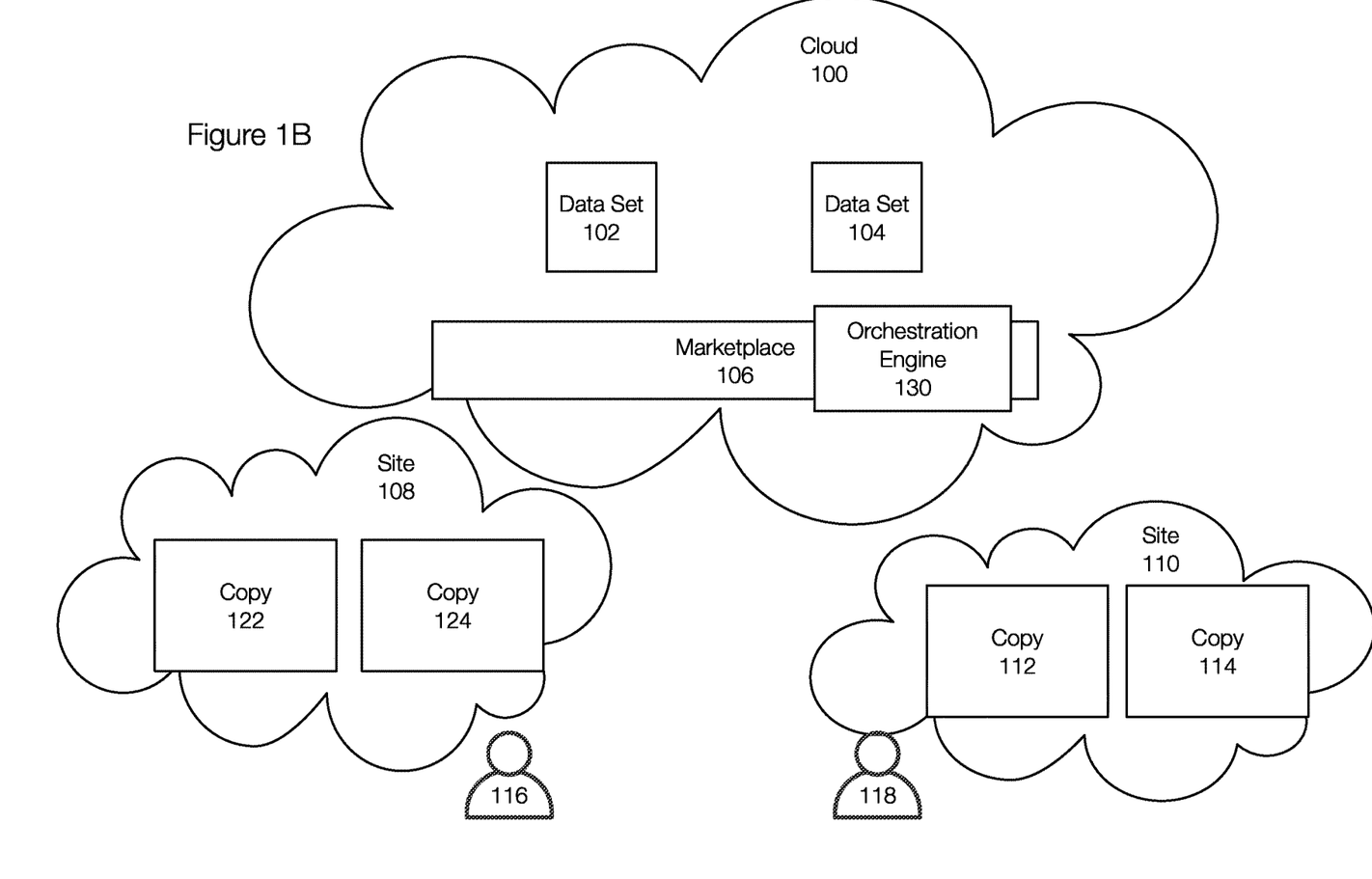
FIG. 1B discloses aspects of data orchestration including movement of copying of recommended data sets to recommended locations.

Next, the user 116 may access the marketplace 106 and identify the data set 102 as a data set of interest. As illustrated in FIG. 1, a copy of the data set is not currently present in the site 108, which is closer to the user 116. Embodiments of the invention may move a copy of the data set 102 to the site 108 as illustrated by the copy 122 in FIG. 1B, which illustrates aspects of predictively orchestrating data sets in a computing environment.

Embodiments of the invention may determine that the users 116 and 118 are similar. This may be based on metadata. For example, users accessing the marketplace 106 may provide information about themselves. If the users 116 and 118 are data scientists, the information may include information related to their roles as data scientists, the entity they are associated with or the like. Additional information may include a record of the searches of the users 116 and 118, the data sets purchased/licensed, accessed, downloaded, or the like. This allows the marketplace 106 to determine whether the users 116 and 118 are sufficiently similar.

In this example, both of the users 116 and 118 were interested in the data set 102 and each of these users 116 and 118 downloaded a copy of the data set 102. The user 118 also accessed the data set 104 and downloaded a copy 114 of the data set 104.

Because the users 116 and 118 are similar, the marketplace 106 may recommend the data set 104 to the user 116 and may proactively deliver a copy 124 of the data set to the site 108. Thus, if the user 116 decides to use the data set 104, the copy 124 is already available to the user 116 at a preferred location—the site 108.

Alternatively, the marketplace 106 may be able to determine that only a portion of the data set 104 will be needed by the user 116. Thus, the copy 124 may only include a portion of the data set 104.

As illustrated in FIG. 1B, the marketplace 106 may include an orchestration engine 130 that is configured to perform operations that aid in orchestration data movement. For example, the orchestration engine 130 may collect metrics from various sources (e.g., the marketplace, the users, the data sets) regarding how the data sets are accessed, which portions of the data sets are accessed, what the data sets are, how the data sets are accessed, and the metadata and configuration supporting these metrics.

The orchestration engine 130 may predict the location that a specific data set is likely to be required and may proactively copy the data set (or portion thereof) to that location. The orchestration engine can predict data sets that a current user is likely to access next and create a predictive copy plan. Thus, based on user and infrastructure settings, the orchestration engine may begin to copy data prior to a request for the data in order to improve the user experience. As previously stated, users may also be permitted to access sections or portions of the data sets. The orchestration engine 130 may copy these specific portions based on anticipated user requests. As previously stated, the anticipated user requests may be based on requests or searches performed or made by similar users or may be based on the similarity of data sets being used independently of user similarity. This accounts for situations where dissimilar users may nonetheless be interested in similar data.

Figure 2:
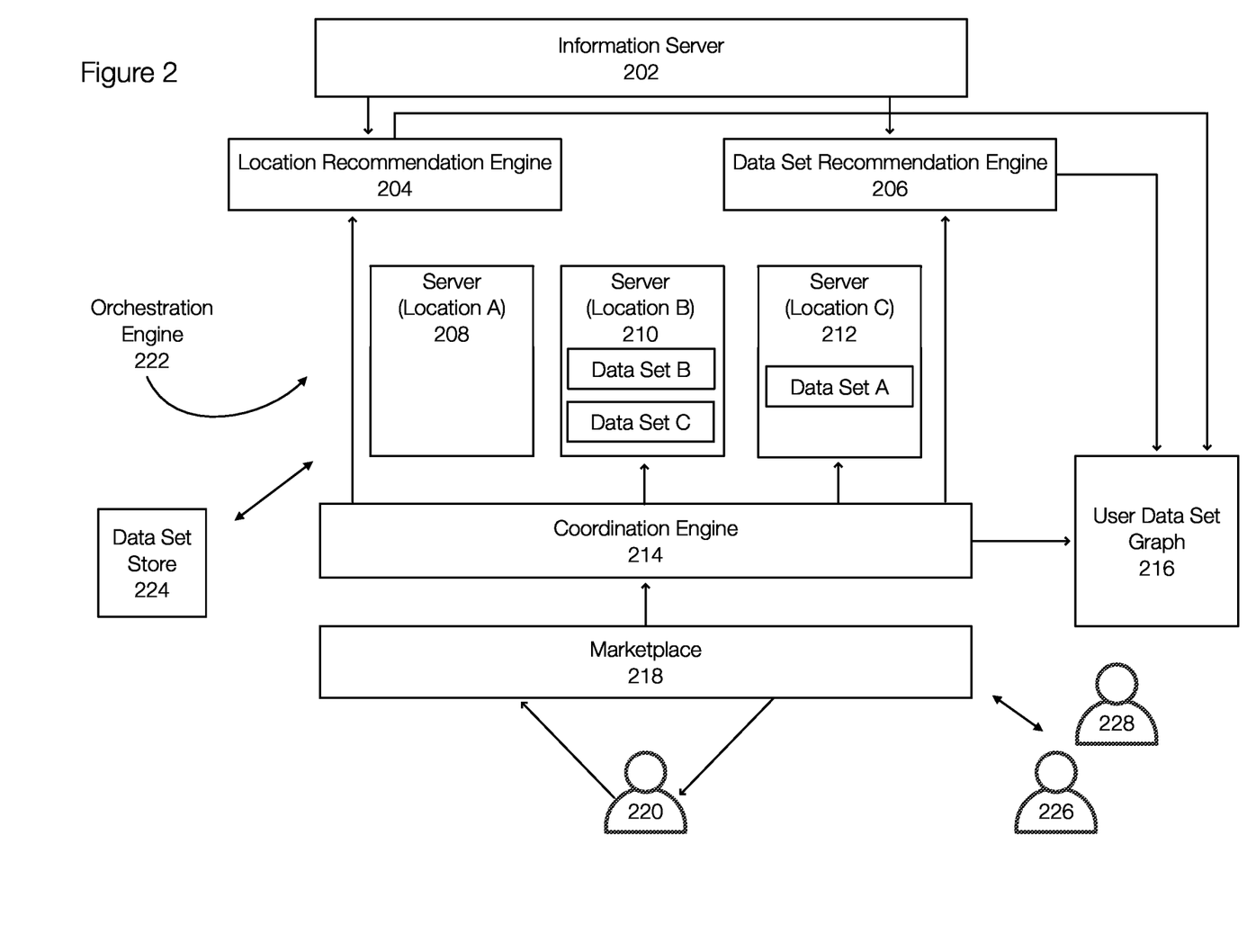
FIG. 2 discloses aspects of an online marketplace including an orchestration engine configured to orchestrate the movement of requested data sets and/or recommended data sets to recommended locations.

FIG. 2 discloses aspects of data set orchestration in a computing environment. In one example, the orchestration engine 130 may include multiple components including, by way of example only, a coordination engine 214, an information server 202, a location recommendation engine 204, and a data set recommendation engine 206.

The information server 202 is configured to store data regarding the orchestration of data sets. The information server 202 may store available location metadata, available storage space, security configurations (public/private), geographical location, IP (Internet Protocol) information, and the like or combination thereof. The information server 202 provides information that may be used by the location recommendation engine 204 and the data set recommendation engine 206 when generating recommendations.

The location recommendation engine 204 is configured to generate a recommendation regarding locations. More specifically, the location recommendation engine 204 may identify an optimal location for the queried data set. More specifically, the location recommendation engine 204 may use previous records of the user's 220 requests, download locations, and current location to determine the optimal location for the queried or requested data set.

The data set recommendation engine 206 is configured to use user 220 metadata and data set metadata, user history and user relatedness from the user data set graph 216 to predict the next data set that the user 220 may access. The user data set graph 216 logs user and data set interactions in a graphical structure in order to derive relatedness and possible recommendations. The user data set graph 216 may track user preferences as well to provide more fine predictions on the exact sections within data sets that may be of interest to the user 220. For example, this information may demonstrate that the user 220 is accessing or downloading the most accessed files or the smallest files first.

The data marketplace 218 is a platform that allows users to buy and/or sell different types of data sets or data streams. The data sets may come from multiple sources and are made available in the marketplace 218. The marketplace 218 may be a cloud service where individuals or business upload data to the cloud. After purchase or license, the user may download the data or directly query the data.

The coordination engine 214 allows these aspects of the orchestration engine 222, which is an example of the orchestration engine 130, to receive user requests and propagate the requests to other components of the orchestration engine 222. The coordination engine 214 logs user requests in the user data set graph 216, retrieves data sets that are predicted to be requested or used by the data set recommendation engine 206 and prefetches the predicted data sets to the nearest location based on the recommendation of the location recommendation engine 204.

FIG. 2 also discloses aspects of a data orchestration workflow or method. For example, the user 20 may access the marketplace 218 using a computing device (computer, tablet, client, server). The marketplace 218 may present a user interface to the user 220 such that the user may browse or search the data sets available in the data set store 224 associated with the marketplace 218. This may include providing terms of interest, size parameters, data set source, or the like. The data set store 224 may include cloud storage, multi-cloud storage, or the like. In other words, the data sets available to users have been previously uploaded and are made searchable and accessible via the market place 218 to users represented by the user 220.

By way of example only, the servers 208, 210 and 212 may be part of the data set store 224. Thus, the server 208 is in location A, the server 210 is in location B, and the server 212 is in location C. The data set A is stored on the server 212 and the data sets B and C are stored on the server 210 in this example.

In one example, the user 220 may request or query a data set A.

Initially, the user 220 may be given access to the data set A, which is on the server 212 in this example. The data set A may also be moved to another location or server.

The orchestration engine 222, however, then operates to identify the next data set that the user 220 may desire to access. Thus, the coordination engine 214 may intercept the request or query from the user 220. The coordination engine 214 can then record predictive factors such as, by way of example only, time, location, occupation, organization or the like or combination thereof.

An example request may be as follows:

```
{
    "timestamp": 1611832185,
    "download location": "Hopkinton",
    "username": "Jane",
    "organization": "ORO",
    "role": "data scientist",
    "data set": "/location/traffic/boston",
    "ip": "192.168.3.203",
    "action": "READ"
}
```

This request, which may also include terms that describe data sets of interest, is sent to the data set recommendation engine 206. The data set recommendation engine 206 uses security data points, knowledge of current and past data set access and location, and knowledge of the relatedness of users from the information server 202 and/or the user data set graph 216 to identify or determine a likelihood of accessing a second data set based on access to the first data set A. As previously stated, user preferences, which may be included in the user data set graph 216, may be used to provide finer-grained predictions on the data subsets of interest.

For example, assume that the user 220, the user 226 and the user 228 are data scientists all associated with the same group. In addition, the data set A represents Boston traffic patterns, the data set B represents New York traffic patterns, and the data set C represents DC traffic patterns. The user data set graph 216 may indicate that the users 226 and 228 have accessed the data set A and subsequently accessed data set B and data set C, in that order.

Because the data set recommendation engine 206 understands that the users 226 and 228 are in the same group as the user 220 and understands that data sets A, B, and C were accessed in that order by the users 226 and 228, the data set recommendation engine 206 may generate a list of data sets that may be accessed by the user 220. In this example, the data set B has the highest likelihood of being accessed next by the user 220.

Thus, the input to the data set recommendation engine may be:

```
{
    "User": "Jane",
    "Location": "Hopkinton",
    "Data set being accessed": "Boston Traffic",
    "LDAPGroup": "Data Scientists"
}
```

The output of the data set recommendation engine 206 may be:

```
"Possible Data Sets": {
    "New York Traffic": "95%",
    "Boston Traffic": "3%",
    "DC Traffic": "2% "
}
```

The coordination engine 214 of the orchestration engine 222 then queries the location recommendation engine 204 to predict the best location for the user 220. The location recommendation engine 204 may make this decision based on information retrieved from the information server 202 such as available storage or geographical location as well as metadata retrieved from the user data set graph 216 such as previous access locations.

The location recommendation engine 204 determines that the user 220 has accessed data sets from the server 212 and may determine that the server 212 has sufficient space to store copies of the data set B and the data set C. The coordination engine 214 then copies the data sets B and C to the server 212. If the user 220 then determines to purchase the data sets B and/or C, the data sets B and C can be accessed more quickly via download or query because the data sets B and C are closer to the user 220.

The orchestration engine 222 can thus determine the next data access and the optimal location to provide recommendations within the marketplace 218 and to start to queue and copy data to the location to improve the user experience and achieve improved marketplace performance.

As described herein, the ability to orchestrate the movement of data sets within a marketplace to be closer to the users of the marketplace includes the capture and analysis of data and metadata such as the current user location history, current user data, and the user interaction type (download, download popular or most accessed portion first, query, etc.). The orchestration engine may also record all marketplace requests made by all users, record or determine a relatedness of users by detecting group affiliation, metadata, permission similarity. The orchestration engine may also record the location to which data sets are copied as part of a marketplace request. The data set size and security requirements may also be compared to secondary information systems security and availability when orchestrating the movement of data within a marketplace.

Figure 3:
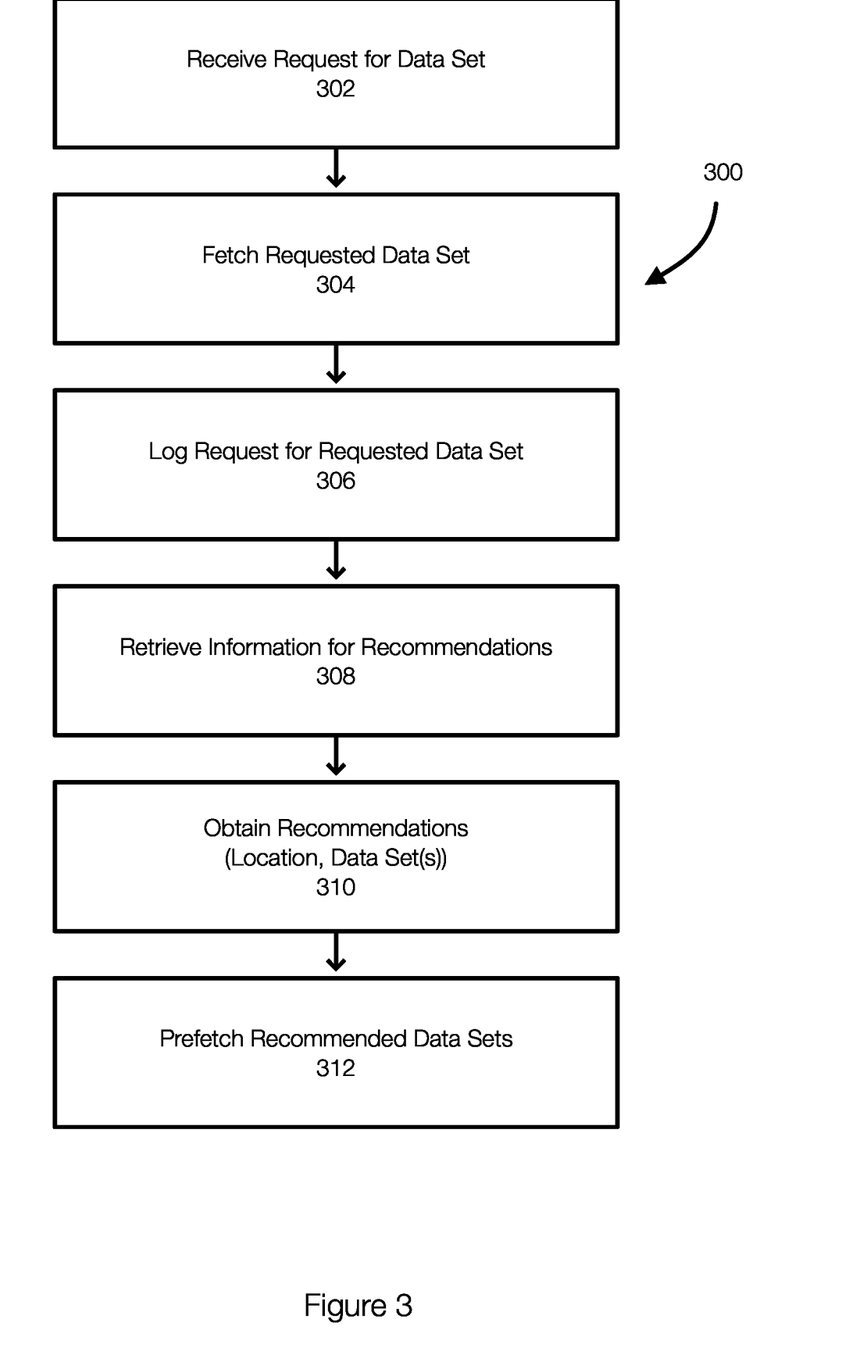
FIG. 3 discloses aspects of a method for orchestration data sets in a computing environment.

FIG. 3 discloses aspects of a method for orchestrating data. The method 300 may begin when a request for a data set is received 302 (e.g., at an online marketplace or by an orchestration engine of an online marketplace). Receiving the request may also include allowing a user to search or browse data sets available in the online marketplace.

Next, the requested data set is fetched 304 or made available to the requesting user. The requested data set may be moved or copied to a location closer to the user or accessed or queried in its existing location by the user. More generally, the requested data set is made available to the user in accordance with any relevant terms or license.

The request for the requested data set is logged 306. This may include storing or augmenting user information in a data set graph. The data set graph is able to store relationships about the user, the requested data set and may include similar historical data. The data set graph allows similar users to be linked or identified. Users that request the same data set, for example, may be linked in the graph and this provides insights. For example, data sets requested by one user may be requested in the future by linked users.

The data set graph allows users to be linked or connected in different ways. The users can be linked based on user similarities. Users from the same group or entity or users in the same field, or the like may be linked. Users may also be linked based on requested data sets, based on the portions of data sets accessed (users may access specific portions of data sets), or the like.

Next, data for making recommendations are retrieved 308. The information may be retrieved from the data set graph and/or from an information server. This information allows recommendations to be obtained 310 or generated. The recommendations include, by way of example only, at least one data set and at least one location. A recommendation may be to orchestrate movement of a particular data set to a particular location in anticipation of a user request.

The recommendations can change over time at least because the needs of a user may change, the location of the user may change, or the like. Thus, the recommendations may be based in part on the user's current request. A request for a data set regarding employment data in a first city suggests that the user may be interested in employment data in a second city. This inference may be strengthened when some of the information indicates that a related user (a co-worker) requested the same data set and then requested another data set.

The requested data is then fetched and recommended data sets are prefetched 312.

In one example, movement of the requested data may begin before the user actually purchases the data set. In other words, if a purchase is expected, data movement may begin. In addition, movement orchestration of the recommended data sets to the recommended locations may begin prior to purchase of the requested data set or after purchase of the requested data set. This helps ensure that, in the event that the user purchases or needs access to one of the recommended data sets, the recommended data set is already at the recommended location.

In addition, orchestration of the data sets may be configured or prioritized based on access patterns. For example, if a user typically accesses a first portion of a data set (e.g., the most popular items in the data set or other portion), the first portion of the data set may be moved or copied to the new location first. Prioritized orchestration helps ensure that the data most likely desired by the user is present at the optimal location. This allows a user to access or use the data set even before all of the data is moved or copied to the desired location.

Embodiments of the invention thus orchestrate the movement or data sets, partially or fully, across different locations based on recommendations from recommendation systems to improve user experience and enhance data marketplace performance. By predictively and intelligently orchestrating the movement of data sets that may be of interest, the time to access the data sets is reduced or minimized. This is useful, by way of example, in data management platforms including low performance networks that may have high latency or low bandwidth.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data orchestration operations including data movement operations, data access operations, data copy operations, or the like.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Embodiments of the invention may operate in physical and/or virtual environments. The modules, components, or engines may be implemented using applications, virtual machines, containers, or the like. As used herein, the term 'data' or 'data set' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. The principles of the disclosure are not limited to any particular form of representing and storing data or other information. Rather, such principles are equally applicable to any object capable of representing information.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: A method, comprising: receiving a request by an orchestration engine of an online marketplace for a data set from a user, wherein the online marketplace provide multiple data sets, logging metadata about the user and the request in a data set graph, generating a recommendation for a second data set based on the data set graph, generating a recommendation for a recommended location, providing the requested data set to the user, and moving or copying the second data set to the recommended location.

Embodiment 2. The method of embodiment 1, further comprising moving the second data set to the recommended location in anticipate of a second request from the user for the second data set.

Embodiment 3. The method of embodiment 1 and/or 2, further comprising determining a current location of the second data set.

Embodiment 4. The method of embodiment 1, 2, and/or 3, wherein the recommended location and the recommendation for the second data set is based on a current user location and a currently location history and current user data.

Embodiment 5. The method of embodiment 1, 2, 3, and/or 4, further comprising moving or copying the second data set based on a typical data set interaction preference.

Embodiment 6. The method of embodiment 1, 2, 3, 4, and/or 5, further comprising moving or copying only a portion of the second data set to the recommended location.

Embodiment 7. The method of embodiment 1, 2, 3, 4, 5, and/or 6, further comprising generating the recommendation for the recommended location and the recommendation for the second data set based on related users, data set metadata, permission similarities, data set size, and/or security requirements.

Embodiment 8. The method of embodiment 1, 2, 3, 4, 5, 6, and/or 7, further comprising generating the recommendation for the second data set based on similar users that requested both the requested data set and the second data set.

Embodiment 9. The method of embodiment 1, 2, 3, 4, 5, 6, 7, and/or 8, further comprising collecting metrics that include determining how the data sets are accesses, a description of each of the data sets, who accesses the data sets, how the data sets are accessed, metadata for each of the data sets, wherein the recommendation for the second data set is based on the metrics associated with at least the requested data set and the second data set.

Embodiment 10. The method of embodiment 1, 2, 3, 4, 5, 6, 7, 8, and/or 9, further comprising allowing access to a portion of the second data set, wherein at least the portion is moved to the recommended location.

Embodiment 11. A method for performing any of the operations, methods, or processes, or any portion of any of these or any combination thereof, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
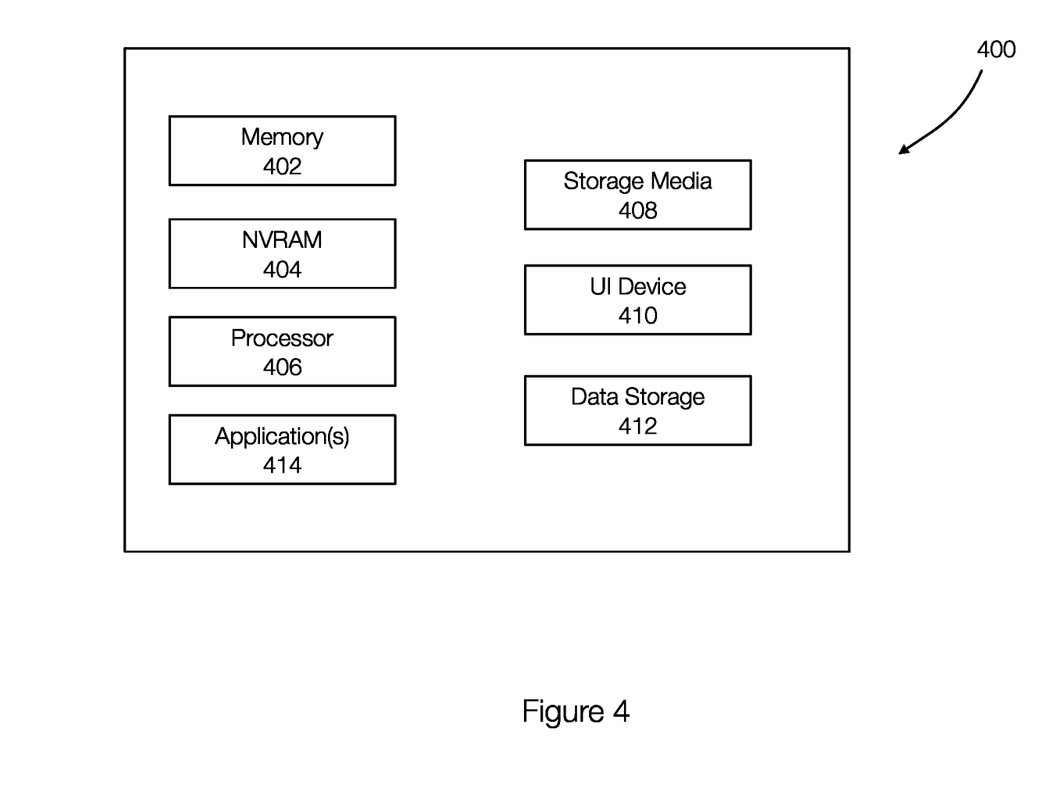
FIG. 4 discloses aspects of a physical computing device or system.

With reference briefly now to FIG. 4, any one or more of the entities disclosed, or implied, by the Figures and/or elsewhere herein, may take the form of, or include, or be implemented on, or hosted by, a physical computing device, one example of which is denoted at 400. As well, where any of the aforementioned elements comprise or consist of a virtual machine (VM) or container and may be a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein. The device 400 is also representative of a computing environment such as a server, a group of servers, a cluster, or virtual machine that provides hardware components.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a request by an orchestration engine of an online marketplace for a data set from a user, wherein the online marketplace provide multiple data sets;
   logging, by a coordination engine, metadata about the user and the request in a data set graph;
   generating, by a data set recommendation engine, a recommendation for a second data set based on the data set graph;
   generating, by a location recommendation engine, a recommendation for a recommended location;
   providing the requested data set to the user; and
   moving or copying the second data set to the recommended location based on a data set access pattern, wherein the data set access pattern identifies an order that the user typically accesses sections of data within the second data set.

2. The method of claim 1, further comprising moving the second data set to the recommended location in anticipate of a second request from the user for the second data set.

3. The method of claim 2, further comprising determining a current location of the second data set.

4. The method of claim 2, wherein the recommended location and the recommendation for the second data set is based on a current user location and a current location history and current user data.

5. The method of claim 1, further comprising moving or copying only a portion of the second data set to the recommended location.

6. The method of claim 1, further comprising generating the recommendation for the recommended location and the recommendation for the second data set based on related users, data set metadata, permission similarities, data set size, and/or security requirements.

7. The method of claim 1, further comprising generating the recommendation for the second data set based on similar users that requested both the requested data set and the second data set.

8. The method of claim 1, further comprising collecting metrics that include at least one of determining how the data sets are accesses, a description of each of the data sets, who accesses the data sets, how the data sets are accessed, and metadata for each of the data sets, wherein the recommendation for the second data set is based on the metrics associated with at least the requested data set and the second data set.

9. The method of claim 1, further comprising allowing access to a portion of the second data set, wherein at least the portion is moved to the recommended location.

10. A non-transitory storage medium having stored therein instructions that are executable by one or more hardware processors to perform operations comprising:
    receiving a request by an orchestration engine of an online marketplace for a data set from a user, wherein the online marketplace provide multiple data sets;
    logging, by a coordination engine, metadata about the user and the request in a data set graph;
    generating, by a data set recommendation engine, a recommendation for a second data set based on the data set graph;
    generating, by a location recommendation engine, a recommendation for a recommended location;
    providing the requested data set to the user; and
    moving or copying the second data set to the recommended location based on a data set access pattern, wherein the data set access pattern identifies an order that the user typically accesses sections of data within the second data set.

11. The non-transitory storage medium of claim 10, further comprising moving the second data set to the recommended location in anticipation of a second request from the user for the second data set.

12. The non-transitory storage medium of claim 11, further comprising determining a current location of the second data set.

13. The non-transitory storage medium of claim 11, wherein the recommended location and the recommendation for the second data set is based on a current user location and a current location history and current user data.

14. The non-transitory storage medium of claim 10, further comprising moving or copying only a portion of the second data set to the recommended location.

15. The non-transitory storage medium of claim 10, further comprising generating the recommendation for the recommended location and the recommendation for the second data set based on related users, data set metadata, permission similarities, data set size, and/or security requirements.

16. The non-transitory storage medium of claim 10, further comprising generating the recommendation for the second data set based on similar users that requested both the requested data set and the second data set.

17. The non-transitory storage medium of claim 10, further comprising collecting metrics that include at least one of determining how the data sets are accesses, a description of each of the data sets, who accesses the data sets, how the data sets are accessed, and metadata for each of the data sets, wherein the recommendation for the second data set is based on the metrics associated with at least the requested data set and the second data set.

18. The non-transitory storage medium of claim 10, further comprising allowing access to a portion of the second data set, wherein at least the portion is moved to the recommended location.

* * * * *